United States Patent Office 3,075,302
Patented Jan. 29, 1963

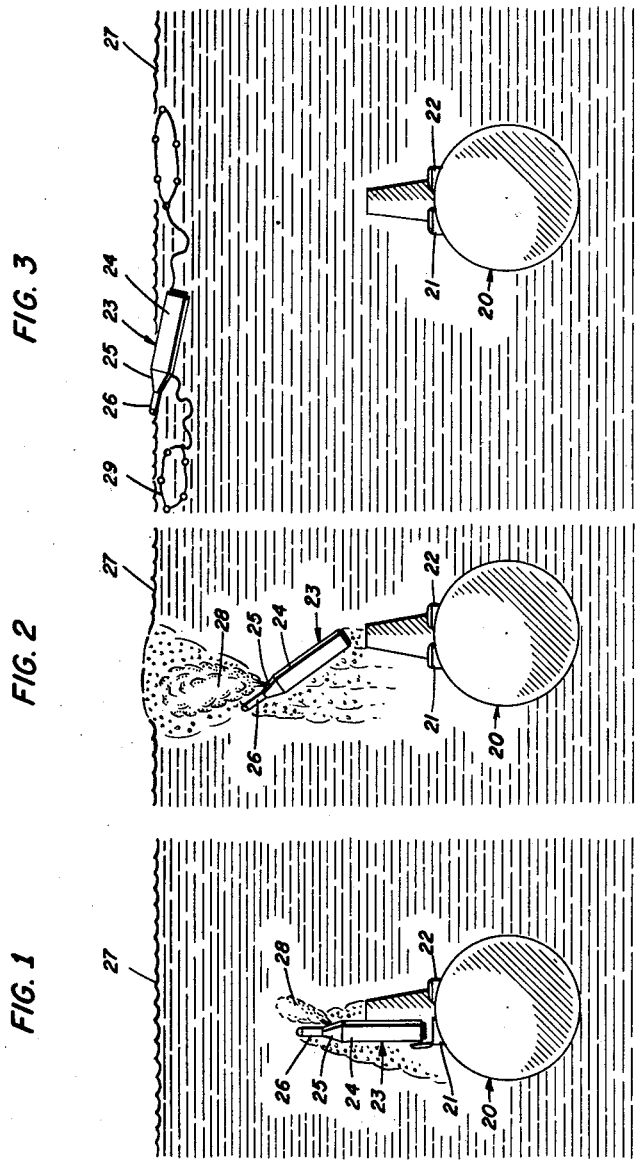

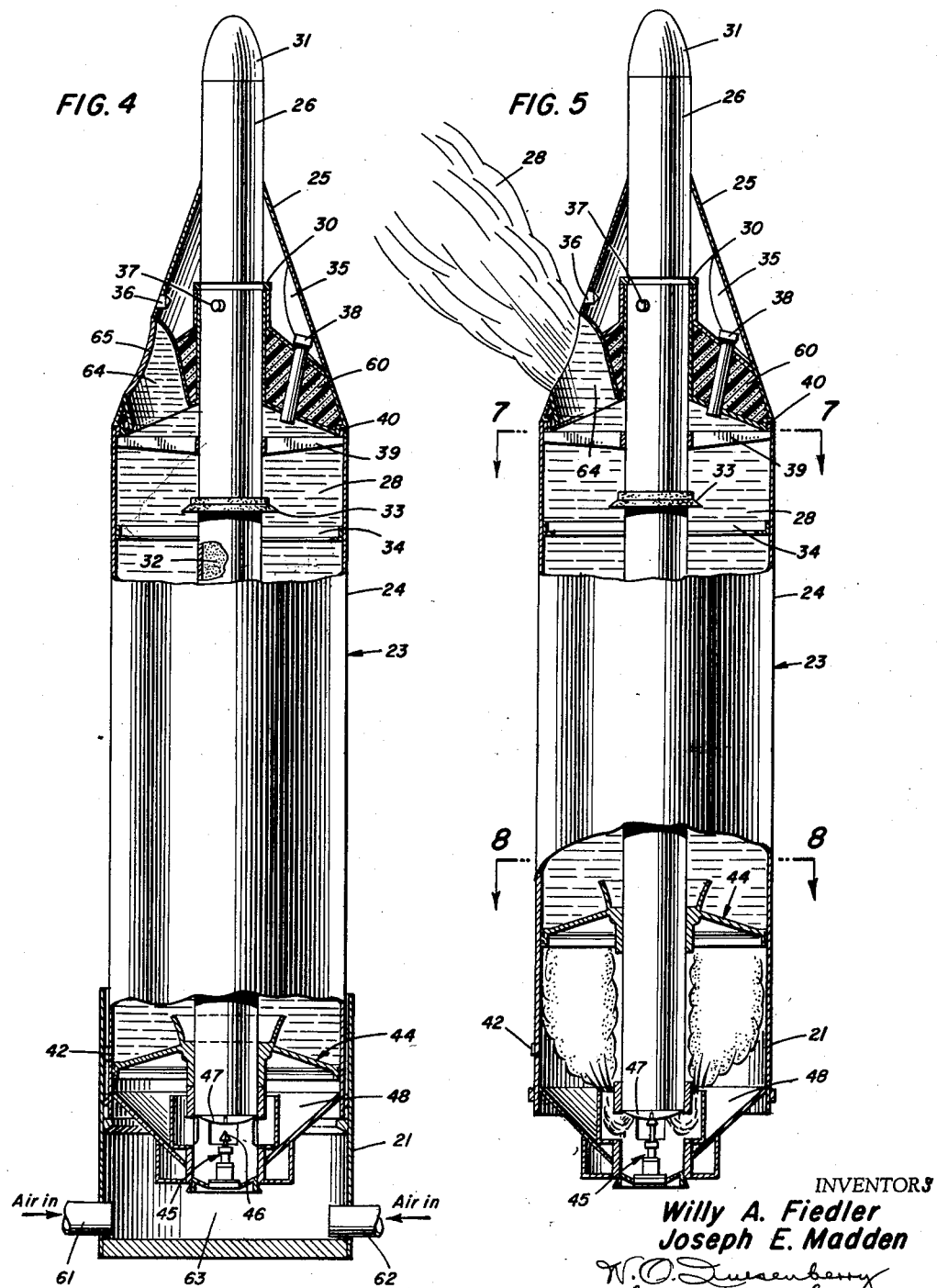

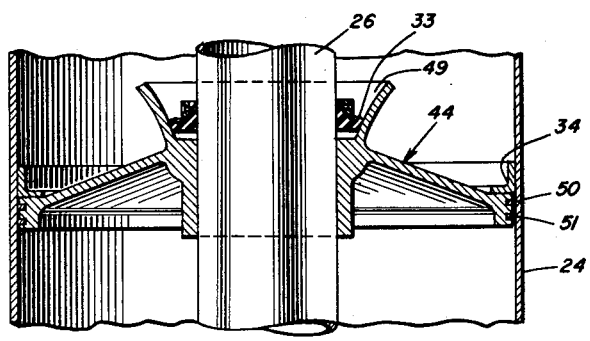
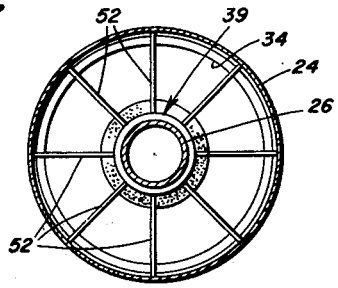
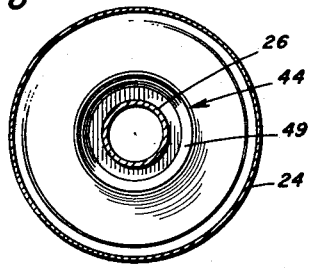
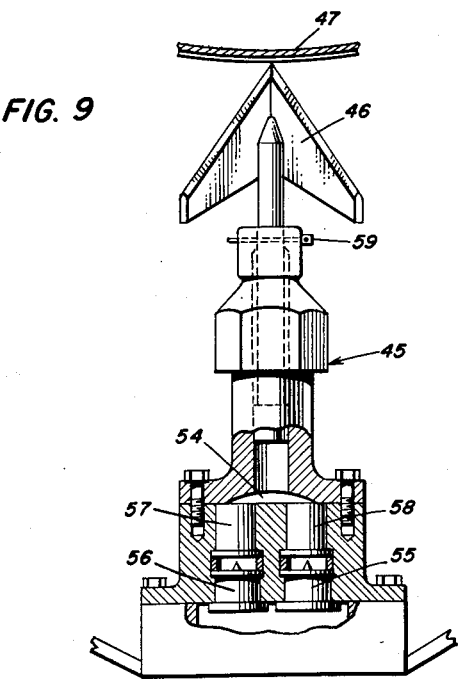
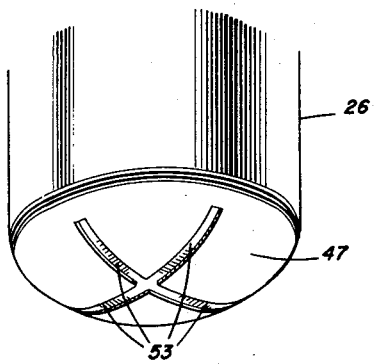

3,075,302
UNDERWATER PITCH-OVER LAUNCH
TEST VEHICLE
Willy A. Fiedler, Los Altos, and Joseph E. Madden, Mountain View, Calif., assignors, by mesne assignments, to the United States of America as represented by the Secretary of the Navy
Filed Aug. 17, 1961, Ser. No. 132,246
11 Claims. (Cl. 35—25)

The present invention relates to missile exercise and test vehicles and more particularly to an underwater launched vehicle for training personnel and checking submerged missile launcher equipment.

This application is related to application Serial No. 123,911 filed July 13, 1961, for Launch and Underwater Trajectory Test Vehicle, by Willy A. Fiedler and Joseph E. Madden, and assigned to the same assignee as the instant application.

In recent years, underwater launched missiles have come to play a vital role in national defense. In the course of developing such underwater launched missiles, a need has arisen for an economical and reuseable exercise and test vehicle, whose cost is only a small fraction of the tactical vehicle being simulated, and which possesses the same weight and external configuration of the tactical propulsive missile. Such a "dummy" missile or dolphin should be useful for underwater launcher checkout and personnel training. An additional problem confronting designers of such exercise and test vehicles has been the quest for a vehicle capable of eliminating fallback upon the vehicle launcher and consequent damage thereto. Furthermore, it is desirable that such underwater launched exercise and test vehicles reach the surface of the water at sufficient lateral distances from the submerged launcher to minimize the possibility of collision with other test vehicles whenever such test vehicles are launched in a salvo firing from adjacent submerged launchers. Those concerned with the development of underwater launched missiles have long recognized the need for such test and exercise vehicles and the present invention fulfills this need.

The general purpose of this invention, therefore, is to provide a non-propulsive underwater launched test and exercise vehicle capable of duplicating performance characteristics of the tactical missile simulated in regard to underwater launching, and which simultaneously minimizes both the danger of launcher damage due to vehicle fallback and the probability of collision with other test vehicles on the water surface. To attain these features, the present invention contemplates a new and improved ballasting and deballasting system which closely simulates the tactical missile and enables the kinetic energy of the test vehicle to be rapidly dissipated during underwater travel following launch. Also contemplated within the scope of the present invention are new and improved means to render the test vehicle buoyant following deballasting, thereby facilitating recovery of the vehicle for subsequent further testing and use.

One object of the present invention is the provision of an improved underwater launched exercise and test vehicle.

Another object is to provide a launch test vehicle possessing the same weight and external configuration of the reference propulsive missile simulated.

An additional object is to provide an underwater launched exercise and test vehicle which minimizes the dangers of fallback upon the missile launcher and collision with other test vehicles.

A further object of the invention is the provision of a launch test vehicle whose kinetic energy is rapidly dissipated during underwater travel prior to broach through the water surface.

Still another object is to provide a test vehicle which is rendered buoyant following test to facilitate recovery.

Yet another object of the present invention is the provision of a launch test vehicle incorporating a new and improved ballasting and deballasting system.

A still further object is to provide a launch test vehicle which simulates a tactical vehicle in a simple and economical manner and which is both readily recoverable and reuseable.

Other objects and many of the attendant advantages of this invention will be readily appreciated as the same becomes better understood by reference to the following detailed description when considered in connection with the accompanying drawings wherein:

FIGS. 1 through 3 illustrate a typical operational sequence for the underwater pitch-over launch test vehicle of the instant invention;

FIG. 4 is an elevation view of a ballasted underwater pitch-over launch test vehicle prior to launching, in accordance with one embodiment of the invention, portions being broken away to show internal structure in greater detail;

FIG. 5 is an elevation view of the test vehicle shown in FIG. 4 of the drawings and illustrates internal structure following launching and initiation of deballasting action;

FIG. 6 is a sectional view of the deballasting piston assembly at the termination of deballasting action;

FIG. 7 is a sectional view taken substantially along the line 7—7 of FIG. 5;

FIG. 8 is a sectional view taken substantially along the line 8—8 of FIG. 5;

FIG. 9 is an elevation view of a typical energy release mechanism and timing device utilized for initiating deballasting, portions being broken away; and FIG. 10 is a perspective view of an accumulator membrane used in conjunction with the energy release mechanism of FIG. 9.

Referring now to the drawings, wherein like reference characters designate like or corresponding parts throughout the several views, there is illustrated in FIGS. 1 thorugh 3 of the drawings a typical operational sequence for one embodiment of the underwater pitch-over launch test vehicle of the instant invention.

FIG. 1 shows an underwater launching device such as the submarine 20, but which may take the form of any suitable launching assembly, either mobile or stationary. The submarine 20 is depicted as having a plurality of launching tubes 21 and 22 from which the launch test vehicle 23 may be launched. The test vehicle 23 is shown in FIG. 1 just after launch from tube 21 of the submarine 20. The test vehicle 23 is shown to comprise a main body shell portion 24 and a cone portion 25. The test vehicle 23 is launched from tube 21 by suitable fluid pressure means, not shown, and the vehicle 23 begins its ascent in an underwater trajectory towards the surface 27 above the submarine 20. FIG. 1 illustrates the test vehicle 23 just as it emerges from launch tube 21 and deballasting of the fluid body 28 through cone 25 has just been initiated.

FIG. 2 shows the underwater pitch-over launch test vehicle 23 after it has cleared submarine 20 and deballasting of fluid body 28 is well underway. At this point the overturning moment due to the rearward impulse exerted on test vehicle 23 by ejection of the deballasted fluid body 28 has caused the test vehicle 23 to pitch-over to a position approximately halfway between the vertical and the horizontal. The test vehicle 23 receives an impulse equal in magnitude but opposite in direction that imparted to the water ballast 28. Due to this rapid deballasting, the forward momentum of the test vehicle 23 is also rapidly reduced to zero due to this essentially rearward impulse. In this manner, the kinetic energy of the test vehicle 23, as it nears the water surface 27, is rapidly dissipated, so that the vehicle 23 is not allowed to rise significantly above the latter surface 27, and thus, the danger of fallback damage to the launcher or submarine 20 is significantly reduced. It will be noted that the impulse exerted upon test vehicle 23 by the deballasting fluid 28 also serves to shift the test vehicle 23 laterally with respect to the submarine or launcher 20.

FIG. 3 shows the missile in its buoyant state floating in the water and awaiting recovery. A messenger line 29 is attached to the shell 24 of the test vehicle 23 to facilitate towing of the vehicle during the recovery process. It will be noted that, after deballasting, the missile floats in an approximately 6° nose up attitude. In this condition, the test vehicle 23 possesses little sail area and has sufficient drag to prevent excessive shift of position by wind, thus facilitating ready recovery. Furthermore, the test vehicle 23 floats in a position which is sufficiently removed laterally from the launcher 21 from which the test vehicle 23 was launched, that salvo firings from other launching tubes, such as may be found in the submarine 20 illustrated in FIGS. 1 through 3 of the drawings, are not likely to collide with other test vehicles 23 already floating on the surface of the water 27. Moreover, in the event such collision does take place, the dissipation of kinetic energy prior to broach would minimize the possibility of resulting damage.

FIGS. 4 and 5 depict in elevation an underwater pitchover launch test vehicle in accordance with the instant invention and suitable for performing an operational sequence as shown in FIGS. 1 through 3 of drawings. The test vehicle shown, though designed primarily for use with a water ballast, may utilize any other suitable inexpensive fluid ballast without departing from the spirit and scope of the present invention, and weighs approximately half as much as the tactical missile simulated when empty. The use of water as a ballast medium for attaining the equivalent launch weight of the simulated tactical missile provides an inexpensive and easily ejected material for making the test vehicle 23 buoyant after completion of the launching. The test vehicle 23 illustrated in FIGS. 4 and 5 of the drawings comprises five principal components which are a main shell 24, a central spine 26, a deballasting piston 44, a truncated cone 25, and a forebody 31.

The main shell 24 of the test vehicle 23 is a right circular cylinder, which may be of metal, plastic or any other suitable structural material, and has the reference missile's exterior dimensions for this section. The aft end of the main shell 24 is closed by a piston 44 and any suitable bottom closure structure which may, in one embodiment, be formed to simulate the motor nozzles of the tactical vehicle. The forward end of the main shell 24 contains a spider assembly 39 which supports and concentrically aligns the central spine 26 with respect to the main shell 24. The main shell 24 also accommodates a forward sealing ring 34, of metal or the like, which is utilized for sealing the outer circumference of the deballasting piston 44 at the end of its travel during the deballasting stroke along spine 26. The main shell 24 is adapted to receive and contain a suitable fluid ballast 28, such as water or the like, and is provided with a drain plug device 42 at its aft end for use whenever removal of the fluid ballast 28 is desired.

The spine 26 is a central tube or cylindrical structure running nearly the full length of the test vehicle 23. The spine 26 has provision for attaching a head or forebody 31, which may be either ballasted or instrumented for evaluation data, at its forward end. A large portion of the spine 26 consists of an air accumulator cavity 32 containing a pressure rupture membrane 47 at its bottom or aft end. The spine 26 is provided with a gas charge valve or filler cap 37 at its top. Of course, it should be understood that, if desired, any type of energy source suitable for the purpose could be readily substituted for the air accumulator energy source in spine 26, with other components of the test vehicle 23 remaining essentially the same. The main portion of the spine 26 acts as a guide for the deballasting piston 44. The lower end of the spine 26 positions rupture membrane 47 of the accumulator 32 adjacent a mechanically or pyrotechnically activated energy release device 45, provided with a piston knife 46, which is activated at a suitable time to cause rupture of the membrane 47 and thereby release the compressed air from accumulator 32 into a plenum or expansion chamber 48. The release of compressed air from the accumulator 32 into plenum chamber 48 forces piston 44 upward along the spine 26 and main shell 24 to cause deballasting of the water or other fluid 28 stored within the main shell 24.

FIG. 4 depicts the internal structure of the test vehicle 23 prior to rupture of the accumulator membrane 47 and initiation of deballasting. FIG. 4 thus depicts a test vehicle 23 prior to its emergence from the launch tube 21 under the influence of a fluid pressure medium introduced to the interior 63 of launch tube 21 via suitable inlet means 61 and 62. In contrast, FIG. 5 illustrates the internal structure of the test vehicle 23 just after emergence or ejection from launch tube 21 and immediately following rupture of the accumulator membrane 47 which releases compressed air into the plenum chamber 48 to force the piston 44 upward along the spine 26 and effect deballasting of the vehicle 23 via ejection of the stored fluid body 28. The spine 26 shown in FIGS. 4, 5, and 6 of the drawings also contains a forward snubber seal ring 33, shown in greater detail in FIG. 8 of the drawings, to seal the inner circumference of the deballasting piston 44 at the termination of the latter piston's forward travel along spine 26 and main shell 24.

FIG. 6 shows the piston 44 in the post-stroke position at the end of the deballasting operation. The piston 44 is a disc comprised of a suitable light material, such as aluminum or the like, which fits slidingly around the spine 26 and extends outwardly to the main shell 24. The piston 44 is shown as incorporating two sets of seal rings 50 and 51, of rubber, silicone plastic or the like. The principal functions of the piston assembly 44 are to drive out the ballast fluid 28, to act as a closure in the forward post-stroke position for rendering the test vehicle 23 buoyant following deballasting procedures, and, in the aft position, prior to deballasting initiation, to prevent the bypass of water into the air expansion or plenum chamber 48 of test vehicle 23. In its forward sealing position piston 44 is stopped by the forward stop seal ring 34 mounted on main shell 24 and is also sealed by seal ring 33 mounted on the spine 26. The forward seal ring 33 on spine 26 may either be of a suitable rubber or plastic material or the like, to snub and hold the piston 44 in its sealing position, or the ring 33 may be of a less flexible material, such as metal or the like, piston 44 being, in this latter instance, held against forward seal rings 33 and 34 by residual gas pressure on its underside. Both of these alternative methods of maintaining the piston 44 in the forward sealing position are considered equally effective in preventing sea water from entering the main shell 24 of test vehicle 23.

Referring now again to FIG. 4 of the drawings, the cone 25 is shown to be a water tight frustrum which mounts upon the central spine 26 and is secured thereto by means of a spine attach clamp 30. Cone 25 attaches to the main shell 24 by means of a simple joint 40. The cone 25 contains a ballast fill tube 38 and an access door 35 to enable ready access to the gas charge valve 37 in spine 26 and the ballast fill tube 38. Deballasting of the fluid body 28 through cone 25 is accomplished through an inclined deballasting tube 64 provided in cone 25. The deballasting tube 64 is provided with a thin pressure cover 65 which is blown from the cone 25 under the influence of fluid pressure following initiation of vehicle deballasting. The ejection of pressure cover 65 permits asymmetrical deballasting of the fluid body 28 through the inclined deballasting tube 64 to produce an overturning moment which causes the test vehicle 23 to perform an underwater pitch-over trajectory. Cone 25 is also provided with an alignment window 36 to enable proper alignment of the test vehicle 23 in the launcher tube prior to actual launch. Insulation 60, of foam or the like, is also provided in cone 25 to limit the exit passage of the deballasting fluid body 28 through cone 25 solely to the inclined deballasting tube 64.

The forebody or nose cone 31 of the test vehicle 23 is attached to the extreme forward end of the spine 26 and may contain either metal or concrete ballast, if the test vehicle 23 is to be used for personnel training or launcher testing purposes, or the forebody 31 may contain an instrumentation package which records in-tube vehicle motions during launch of the test vehicle 23 from the launcher tube 21.

FIG. 7 is a sectional view taken substantially along the line 7—7 of FIG. 5 and shows in detail the structure of the spider assembly 39 which supports and centrally aligns the spine 26 with respect to the main shell 24. The spider 39 is shown to comprise a plurality of rib sections 52 which provide axial rigidity for the main shell 24 as well as a suitable passage for ballast fluid entering via the ballast fill tube 38 shown in FIG. 4.

FIG. 8 is a sectional view taken substantially along the line 8—8 of FIG. 5 and, when considered in combination with FIG. 6, illustrates in detail the sructure of the deballasting piston 44. The piston assembly 44 is shown to include a flared cup section 49 which acts in conjunction with the forward seal ring 33 to provide a variable-orifice water trap for effectively decelerating the piston 44 during the latter portion of the deballasting stroke.

FIG. 9 depicts in greater detail the timing and energy release mechanism 45 shown in FIGS. 4 and 5 of the drawings. The mechanism 45 is shown to comprise a pair of timers 55 and 56. The timers 55 and 56 activate suitable pyrotechnic devices or cartridges 57 and 58 to cause rapid gas expansion in a firing chamber 54. The latter increase in gas pressure causes the shear pin 59 to shear and expells the piston knife 46 into the membrane 47 of the accumulator 32 housed within spine 26. It will be understood that, if desired, any other suitable type of driving means may be utilized to expell the piston knife 46 without departing from the spirit and scope of the instant invention and the depicted pyrotechnic embodiment is to be considered solely as illustrative. Moreover, the use of a single timing mechanism in lieu of the dual timers 55 and 56 is likewise contemplated by the present invention.

FIG. 10 illustrates a rupture membrane 47 mounted at the aft end of the spine 26. The rupture membrane 47 is fabricated of a soft metal, such as Monel or the like, and is scored with radial grooves 53 in alignment with the blades of piston knife 46 to insure positive penetration of the membrane 47 via the knife 46 without fragmentation.

Additional ballast for the test vehicle 23 may be placed at any convenient location in the vehicle such as in the simulated nozzle area 43 shown in FIG. 4, or in the main shell 24, and may consist of any suitable ballast material, such as concrete or metal or the like.

The test vehicle of the instant invention provides economical and reuseable means for testing underwater launching devices and for training personnel. The test vehicle simulates the tactical vehicle by possessing the same weight and external configurations of the reference propulsive missile being simulated. The deballasted vehicle weighs only a small part of its launch weight and has its kinetic energy rapidly reduced to zero during underwater travel to minimize fallback upon the launcher as well as the possibility of collision with other test vehicles during salvo launchings in which a plurality of test vehicles are launched simultaneously or in rapid consecutive order. The test vehicle is also rendered buoyant upon completion of its underwater pitch-over trajectory and the latter feature of buoyancy enables ready recovery for subsequent reuse.

Obviously, many modifications and variations of the present invention are possible in the light of the above teachings. It is therefore to be understood that, within the scope of the appended claims, the invention may be practiced otherwise than as specifically described.

What is claimed is:

1. An underwater pitch-over trajectory launch test vehicle to be fired from an underwater launcher towards the water surface, said vehicle comprising a cylindrical main body shell, a fluid ballast contained by said cylindrical main body shell, a spine disposed within and supported in coaxial alignment with the main body shell, a cone structure on the main body shell, means for fixedly attaching said cone structure and spine to said main body shell, the axis of revolution of said cone structure being coaxial with said spine and the main body shell, a deballasting tube in said cone structure, the axis of said deballasting tube being inclined with respect to the longitudinal axis of said spine, a pressure cover for said inclined deballasting tube, piston deballasting means slidably supported and movable along said spine by gas pressure to eject said pressure cover and said fluid ballast in a direction inclined to the forward longitudinal direction of vehicle motion and to render said vehicle buoyant, and means including a gas pressure device to energize and move said piston deballasting means along said spine upon emergence of said vehicle from said underwater launcher, whereby the kinetic energy of said vehicle is rapidly dissipated during underwater travel and said vehicle may be readily recovered in its buoyant state.

2. An underwater pitch-over trajectory launch test vehicle to be fired from an underwater launcher towards the water surface, said vehicle comprising a cylindrical main body shell, fluid ballast contained by said cylindrical main body shell, a cone structure on said main body shell, means for fixedly attaching said cone structure to said main body structure, piston deballasting means disposed within the main body shell to eject said fluid ballast therefrom as the piston deballasting means is moved within said main body shell, means in said cone structure for allowing said fluid ballast to be ejected from the main body shell as the piston deballasting means moves therein to render the vehicle buoyant, a spine centrally disposed within the main body shell and fixed thereto and to the cone structure in spaced relationship with the main body shell for slidably supporting the piston deballasting means therein, and means including a gas pressure device disposed within the main body shell for energizing and moving said deballasting means upon emergence of said test vehicle from said underwater launcher, whereby the kinetic energy of said vehicle is rapidly dissipated during underwater travel and said vehicle may be readiily recovered in its buoyant state.

3. An underwater pitch-over trajectory launch test vehicle to be fired from an underwater launcher towards the water surface, said vehicle comprising a cylindrical main body shell, a fluid ballast contained by said cylindrical main body shell, a central spine supported in coaxial alignment with the main body shell, a cone structure fixedly attached to the main body shell and the spine, means for fixedly attaching said cone structure to the forward end of said main body shell and to the spine, the axis of revolution of said cone structure being coaxial with the spine and the main body shell, a deballasting tube in said cone structure, the axis of said deballasting tube in the cone structure being inclined with respect to the longitudinal axis of said spine, a pressure cover for said inclined deballasting tube, deballasting piston means within said main body shell and slidably supported on the spine for movement within the main body shell to eject said pressure cover and said fluid ballast in a direction inclined to the forward longitudinal direction of vehicle motion so as to produce an overturning moment, gas pressure means for driving said deballasting piston means, sealing means in the forward end of said main body shell engageable with said deballasting piston means upon ejection of said fluid ballast by the deballasting piston means for rendering said vehicle buoyant, means including timer devices for actuating said gas pressure driving means upon emergence of said test vehicle from said underwater launcher, whereby the kinetic energy of said test vehicle is rapidly dissipated during underwater travel and said vehicle may be readily recovered in its buoyant state.

4. An underwater pitch-over trajectory launch test vehicle to be fired from an underwater launcher upwards to the water surface, said vehicle comprising a cylindrical main body shell, a fluid ballast contained by said main body shell, a central spine supported in coaxial alignment with said main body shell, a frustum of a cone structure fixedly supported in engagement with said spine and said main body shell, the axis of revolution of said cone structure being coaxial with said spine and said main body shell, a deballasting tube in said cone structure, the axis of said deballasting tube being inclined with respect to the longitudinal axis of said spine, a pressure cover for said inclined deballasting tube, piston deballasting means for ejecting said pressure cover and said fluid ballast in a direction inclined to the forward longitudinal direction of vehicle motion, said piston deballasting means being located within said main body shell and in sliding engagement with said central spine and the interior of said main body shell, sealing means at the forward end of said main body shell for rendering said vehicle buoyant upon the ejection of said fluid ballast by said piston deballasting means, gas pressure means for driving said deballasting means, timer means, and means responsive to said timer means to actuate said gas pressure means upon emergence of said test vehicle from said underwater launcher, whereby the kinetic energy of said test vehicle is rapidly dissipated during underwater travel by the rearward impulse of said ejected fluid ballast upon said vehicle and said vehicle may be readily recovered in its buoyant state.

5. The test vehicle of claim 4 wherein said fluid ballast is water.

6. The test vehicle of claim 4 wherein said gas pressure means includes a source of high pressure air.

7. The test vehicle of claim 4 wherein said gas pressure means includes a pressurized air-filled accumulator cavity within said spine and a rupture membrane at the base of said spine, and said timer responsive means includes a piston knife adapted to pierce said rupture membrane.

8. The test vehicle of claim 4 wherein said sealing means includes a first pitson sealing ring mounted concentrically along the interior wall of said main body shell and a second piston sealing ring mounted concentrically on the outer wall of said spine.

9. The test vehicle of claim 7 wherein said rupture membrane is scored in alignment with the blades of said piston knife to eliminate fragmentation.

10. The device of claim 7 wherein said piston knife is pyrotechnically actuated by said timer means to pierce said rupture membrane.

11. The device of claim 8 wherein the forward end of said piston deballasting means possesses a cup flare providing a variable-orifice fluid trap with said second piston sealing ring, whereby said piston deballasting means is decelerated during the latter portion of its travel along said spine and said main body shell.

References Cited in the file of this patent

UNITED STATES PATENTS

| | | |
|---|---|---|
| 1,376,316 | Chilowsky | Apr. 26, 1921 |
| 2,539,643 | Smythe | Jan. 30, 1951 |